US010381759B2

(12) United States Patent
Park et al.

(10) Patent No.: US 10,381,759 B2
(45) Date of Patent: Aug. 13, 2019

(54) CARD SOCKET FOR ELECTRONIC DEVICE

(71) Applicant: Molex, LLC, Lisle, IL (US)

(72) Inventors: Jeong Yong Park, Ansan (KR); In Chull Yang, Ansan (KR)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/362,278

(22) Filed: Nov. 28, 2016

(65) Prior Publication Data

US 2017/0250480 A1    Aug. 31, 2017

(30) Foreign Application Priority Data

Nov. 30, 2015 (KR) .................. 10-2015-0169212

(51) Int. Cl.
| | |
|---|---|
| *H01R 29/00* | (2006.01) |
| *H01R 12/70* | (2011.01) |
| *H01R 12/72* | (2011.01) |
| *G06K 7/00* | (2006.01) |
| *G06K 13/08* | (2006.01) |

(52) U.S. Cl.
CPC ....... *H01R 12/7094* (2013.01); *G06K 7/0021* (2013.01); *G06K 7/0069* (2013.01); *G06K 13/08* (2013.01); *H01R 12/721* (2013.01)

(58) Field of Classification Search
CPC .. H01R 12/7094; H01R 12/721; H01R 12/85; H01R 12/87; H01R 13/71; H01R 13/7036; H01R 13/70; H01R 13/703
USPC ............................ 439/620.01, 188
See application file for complete search history.

(56) References Cited

U.S. PATENT DOCUMENTS

| | | | | |
|---|---|---|---|---|
| 5,334,034 | A * | 8/1994 | Reichardt | ............ G06K 7/0021 |
| | | | | 200/51.1 |
| 6,283,376 | B1 * | 9/2001 | Schuder | ............... G06K 7/0021 |
| | | | | 235/486 |
| 6,425,775 | B1 * | 7/2002 | Chang | .................. G06K 7/0069 |
| | | | | 439/188 |
| 6,652,300 | B2 | 11/2003 | Nlshioka | |
| | | | (Continued) | |

FOREIGN PATENT DOCUMENTS

| | | | | |
|---|---|---|---|---|
| CN | 200953411 Y | | 9/2007 | |
| EP | 0999512 A2 * | | 5/2000 | ........... G06K 7/0021 |
| | (Continued) | | | |

OTHER PUBLICATIONS

Tatsuki, Watanabe, Card Connector, Sep. 3, 2014, Translation.*
(Continued)

*Primary Examiner* — Edwin A. Leon
*Assistant Examiner* — Milagros Jeancharles
(74) *Attorney, Agent, or Firm* — Molex, LLC

(57) ABSTRACT

A card socket for use in electronic devices is disclosed that can prevent the pushing of the card tray via vertical contact action of the detect terminal and switch terminal. The card socket includes a detection switch that is activated when a card tray has been inserted into the card tray insertion space of a housing in an insertion direction. The detection switch includes a detect terminal that is installed within the insertion space so that when the card tray is inserted into the insertion space the detection switch is activated. The detect terminal is configured to exert a force on the card tray in a direction that is perpendicular to the insertion direction.

31 Claims, 10 Drawing Sheets

(56) References Cited

U.S. PATENT DOCUMENTS

| | | | | |
|---|---|---|---|---|
| 6,899,557 B2* | 5/2005 | Hirata | ............... | G06K 7/0069 |
| | | | | 439/188 |
| 7,159,773 B2* | 1/2007 | Yang | ............... | G06K 7/003 |
| | | | | 235/441 |
| 7,866,994 B1* | 1/2011 | Yang | ............... | H01R 13/635 |
| | | | | 439/153 |
| 7,909,650 B2* | 3/2011 | Matsunaga | ............... | H01R 13/703 |
| | | | | 439/630 |
| 7,997,913 B2* | 8/2011 | Ida | ............... | G06K 13/08 |
| | | | | 439/159 |
| 8,770,995 B2* | 7/2014 | Naito | ............... | G06K 7/0021 |
| | | | | 439/159 |
| 9,444,196 B2* | 9/2016 | Wang | ............... | G06K 19/00 |
| 2002/0119688 A1* | 8/2002 | Nishioka | ............... | G06K 13/067 |
| | | | | 439/188 |
| 2002/0137380 A1* | 9/2002 | Shishikura | ............... | G06K 7/0013 |
| | | | | 439/188 |
| 2003/0195020 A1* | 10/2003 | Kubo | ............... | H04B 1/3816 |
| | | | | 455/575.1 |
| 2006/0076409 A1* | 4/2006 | Ko | ............... | G06K 7/0021 |
| | | | | 235/441 |
| 2006/0116027 A1* | 6/2006 | Tseng | ............... | G06K 7/0021 |
| | | | | 439/630 |
| 2006/0273174 A1* | 12/2006 | Laitinen | ............... | G06K 13/08 |
| | | | | 235/441 |
| 2012/0149224 A1* | 6/2012 | Tsuji | ............... | H01R 12/7094 |
| | | | | 439/188 |

FOREIGN PATENT DOCUMENTS

| | | |
|---|---|---|
| KR | 10-1228837 B1 | 2/2013 |
| KR | 2014-0106399 A | 9/2014 |
| KR | 20140106399 A * | 9/2014 |
| KR | 10-1468955 B1 | 12/2014 |

OTHER PUBLICATIONS

Office Action received for Korean Patent Application No. 10-2015-0169212, dated Jul. 18, 2017, 6 pages. (3 pages of English Translation and 3 pages of Official Copy).

* cited by examiner

CARD SOCKET FOR ELECTRONIC DEVICE

RELATED APPLICATIONS

This application claims priority to Korean Application No. 10-2015-0169212, filed Nov. 30, 2015, which is incorporated herein by reference in its entirety.

TECHNICAL FIELD

This disclosure relates to a card socket for use in electronic devices, and more specifically to a card socket for use in electronic devices that can prevent pushing of the card tray.

BACKGROUND ART

Various cards memory cards/SIM cards storing a subscriber's various personal information, etc., such as telephone number, are used in electronic devices such as mobile phones. Ways of inserting these cards include inserting the card alone, and inserting the card mounted on a separate tray.

In card sockets of this type, a detection switch is furnished that senses when the card tray has been fully inserted. Generally, the card insertion terminal consists of a detect terminal that contacts the front end of the card tray when the card tray is inserted, and a switch terminal that is pushed backward and contacts the detect terminal when the card tray has been fully inserted.

A detection switch structure having this configuration is disclosed in Republic of Korea Unexamined Patent Publication No. 10-2014-0106399 hereinafter "Prior Art Reference 1" and Republic of Korea Registered Patent No. 10-1228837 hereinafter "Prior Art Reference 2".

The prior art references are generally configured so that upon card tray insertion, the detect terminal is pushed backward and then contacted to the switch terminal. The detect terminal has internal elasticity such that when the card tray is withdrawn, after it has been pushed backward upon card tray insertion, it returns to its original state.

Likewise, in the case of the prior art references, because the detect terminal has internal elasticity that pushes backward when the card tray is inserted, force is continuously applied to the card tray by the detect terminal in the withdrawal direction. As a result, there is a risk of an external nonconformity between the card tray and set, due to the tray protruding outward or the card socket being slightly pushed outward.

SUMMARY OF THE INVENTION

The card socket comprises a housing with an insertion space and a detection switch with a detect terminal that is installed in the insertion space of the housing and is configured to be contacted with the card tray and deflected out of the insertion space when the card tray is inserted into the insertion space in an insertion direction. The detection switch also includes a switch terminal that is installed in the housing and that is configured to change between a connected and a disconnected state with the detect terminal when the card tray is inserted into the insertion space. Due to the configuration of the detect terminal, the detect terminal exerts a force on the card tray that is perpendicular to the insertion direction. In an embodiment the detect terminal may include an insulating part formed on the detect switch and the insulating part can be configured to make insulative contact with the card tray.

BRIEF DESCRIPTION OF THE DRAWINGS

FIG. 4A is a perspective view and FIG. 4B is a cross-section.

FIG. 5A is a perspective view and FIG. 5B is a cross-section.

FIG. 6A is a perspective view and FIG. 6B is a cross-section.

FIG. 7A is a perspective view and FIG. 7B is a cross-section.

FIG. 8A is a perspective view and FIG. 8B is a cross-section.

DETAILED DESCRIPTION OF THE PREFERRED EMBODIMENTS

Hereinbelow, a preferred embodiment of the card socket for use in an electronic device will be described, with reference to the attached drawings. Please note that in the below description, the detailed explanation is omitted of functions and components which are common knowledge and would unnecessarily obscure the substance of the disclosure.

One benefit of this disclosure is to provide a card socket for use in electronic devices that avoids pressing the card tray out of the card socket. This is because a detection switch positioned in the housing is configured to avoid urging an inserted card tray out of the card socket but instead exerts a force that is perpendicular to the insertion direction once the card tray is inserted.

Other potential benefits include the use of an insulating part that can be formed on the detect terminal to help insulate the detect terminal from an inserted card tray. This helps avoid undesired current flow paths. The insulating part can also extend below the detect terminal so as to ensure the detect terminal does not engage a support circuit board. The shape of the detect terminal can also be configured to reduce deformation of the detect terminal which will help reduce the possibility of any set in the detect terminal.

Figure 1:
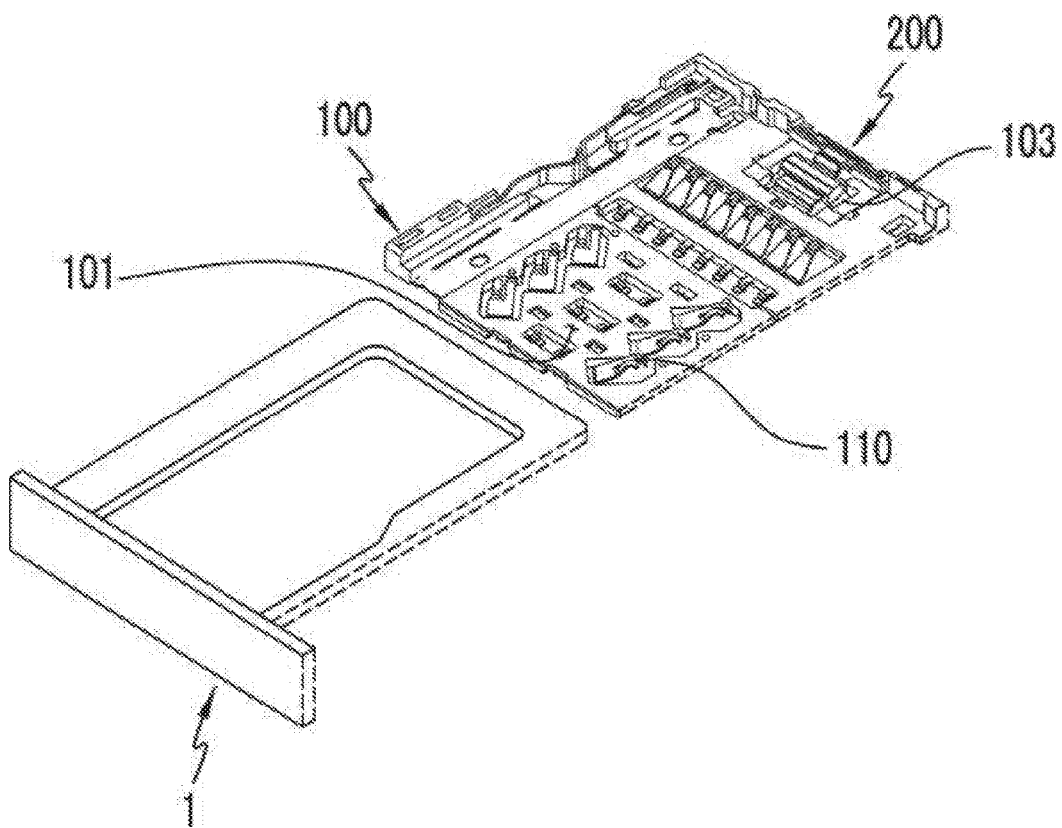
FIG. 1 is a perspective view showing the condition of the card socket when a card tray has been inserted therein.
Figure 2:
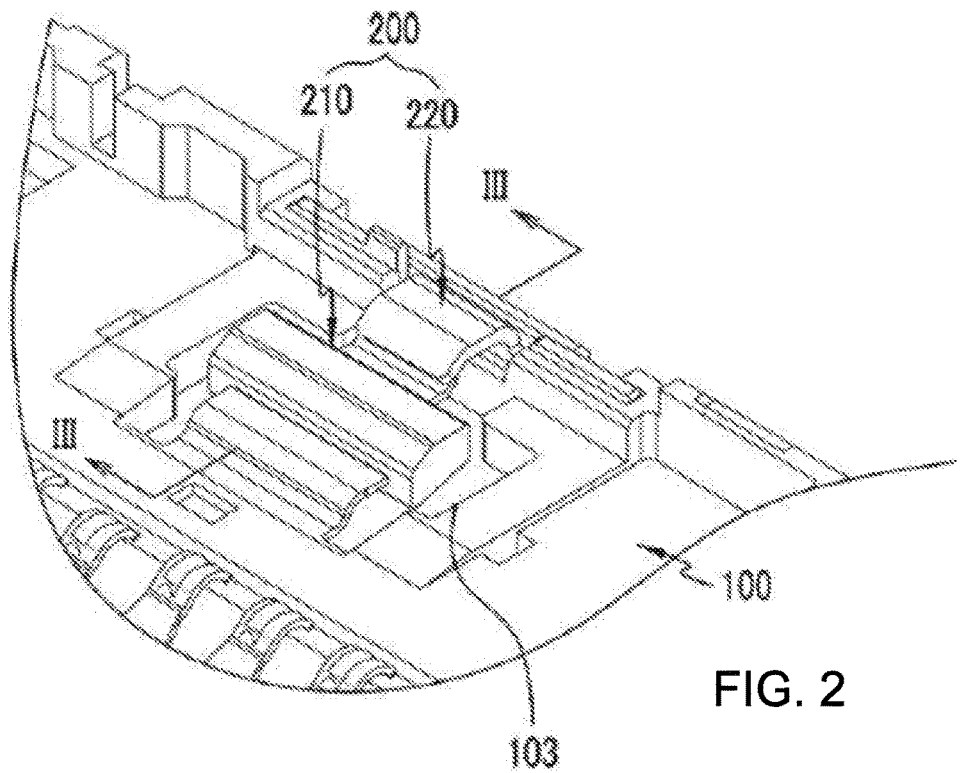
FIG. 2 is a perspective view of the detect terminal and switch terminal furnished on the housing of the card socket.
Figure 3:
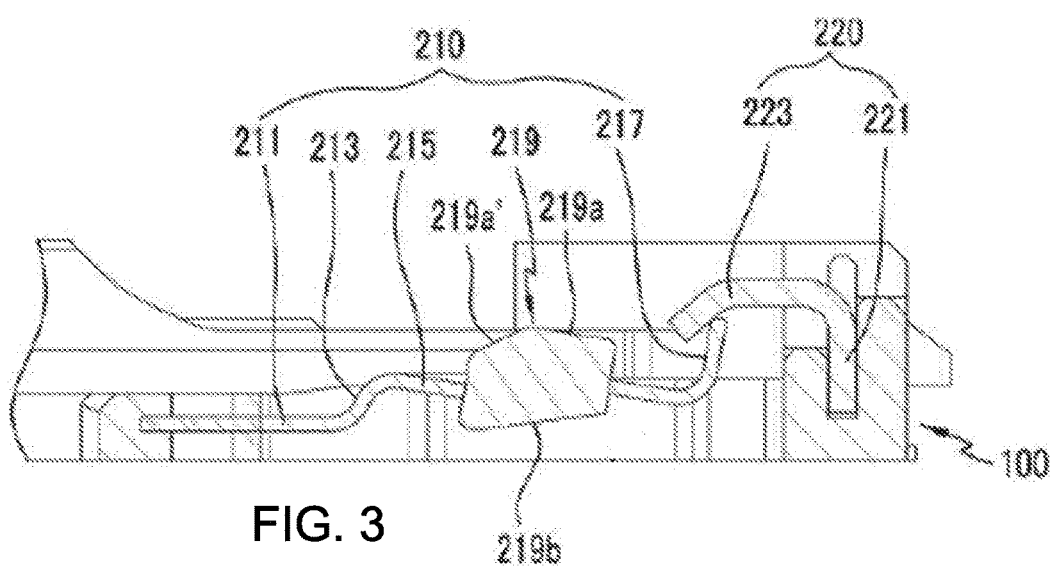
FIG. 3 is a cross-sectional view taken along a line m-m of FIG. 2.
Figure 4A:
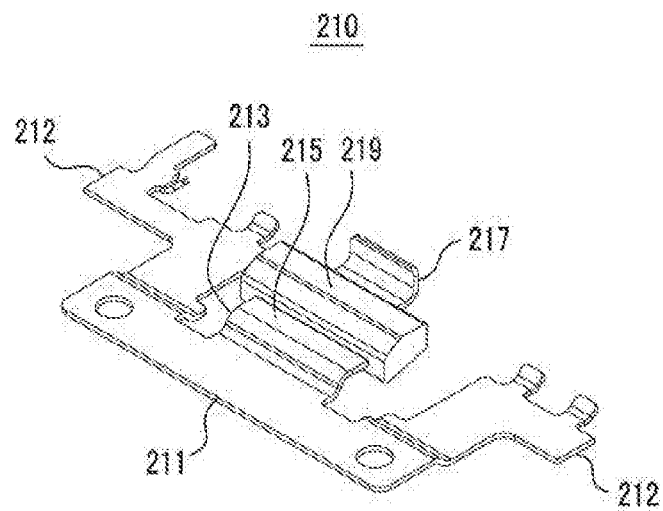
FIGS. 4A and 4B show the detect terminal where
Figure 4B:
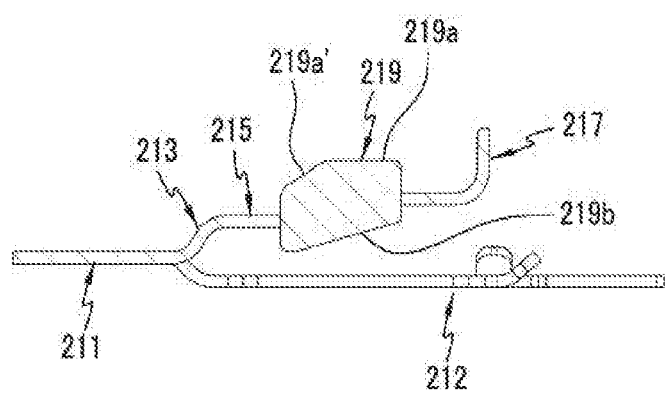

FIG. 1 is a perspective view showing the condition of the card socket for use in electronic devices according to one embodiment, when a card tray has been inserted therein. Note that in FIG. 1, the card socket is depicted without showing the metal shell that covers the housing.

The housing 100 that makes up the card socket 10 has an insertion space 101, open to the front, where the card tray 1 is inserted, and to the top, which is covered by a metal shell not shown. On the base surface of the insertion space 101, a contact terminal 110 is formed that contacts the card, and in the back part of the insertion space, a detection switch 200 is formed that detects when the card tray 1 is inserted.

In addition, on the bottom part of the insertion space 101 of the housing 100, a detect terminal 210 is positioned in an aperture 103 so that the detect terminal 210 is capable of vertical elastic deflection. The shape of the aperture 103 corresponds to the shape of the detect terminal 210; it should preferably be slightly larger than the planar area of the detect terminal 210.

As shown in FIGS. 2 through 6B, the card socket for use in electronic devices may be furnished above and below with a switch terminal 220 and detect terminal 210, which make up a detection switch 200 that senses when a card tray 1 has been inserted into the back portion of the insertion space 101 of the housing 100. The switch terminal 220 may comprise a 2nd fixing part 221, and a 2nd contact part 223. The 2nd fixing part 221 is formed as a vertical plate and is fixed in place by being assembled by insertion into the assembly recess, see FIGS. 7A and 7B formed on the rear end of the housing 100. In the 2nd fixing part 221, a detachment-prevention projection 222 may be formed and fixed in place by insertion into the recess part (not shown) formed inside an assembly recess.

The detection switch 200 consisting of the detect terminal 210 and switch terminal 220 makes it possible to detect when a card tray 1 has been inserted into the insertion space 101, because in the process of the card tray 1 being inserted into the insertion space 101, the card tray 1 pushes the detect terminal 210 downward so as to break the contact with the switch terminal 220.

In other words, if the detect terminal 210 and switch terminal 220 are in contact, it may detect that the card tray 1 is not inserted or has not been completely inserted, and if the detect terminal 210 and switch terminal 220 are not in contact but are separated, it may detect that the card tray 1 has been fully and completely inserted into the insertion space 101.

Figure 11:
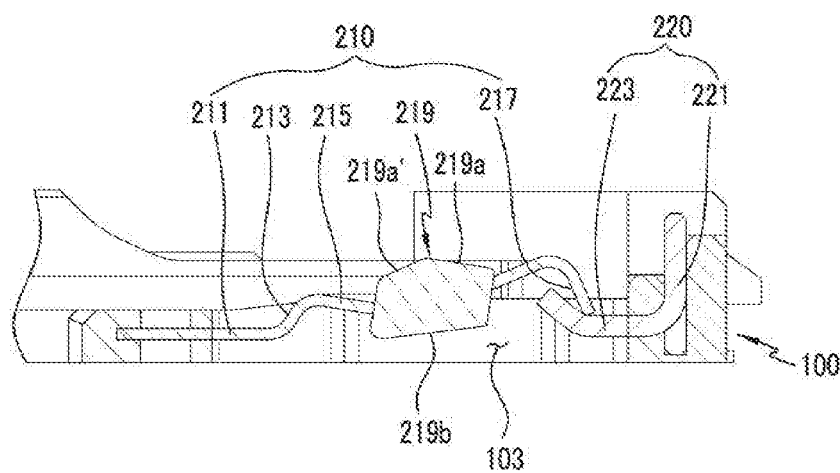
FIG. 11 is a cross-section showing a different embodiment of the detect terminal and switch terminal in the housing of the card socket.

Alternatively, as shown in FIG. 11, the detect terminal 210 may be configured in the form of a cantilever, with the switch terminal 220 installed on the bottom of the cantilever free end of the detect terminal 210, and the switch terminal 220 may contact the detect terminal 210 as the detect terminal is pushed downward. By this means, if the detect terminal 210 and switch terminal 220 are not in contact, it may detect that the card tray 1 is not inserted or has not been completely inserted, and if the detect terminal 210 and switch terminal 220 are in contact, it may detect that the card tray 1 has been fully and completely inserted into the insertion space 101. Thus, the detection switch 200 can detect a change in state between the detect terminal 210 and the switch terminal 220 and thus provide a signal that indicate whether a card tray is fully inserted.

In particular, the depicted construction can prevent the card tray 1 from being pushed in the withdrawal direction, because the insertion/withdrawal direction of the card tray 1 is perpendicular to the vertical contact-point direction of the detect terminal 210 and switch terminal 220. In other words, because the detect terminal 210 and switch terminal 220 are in contact vertically, the card tray 1 is not affected by any force in the withdrawal direction due to the detect terminal 210, and thus there is no risk of an exterior nonconformity between the card tray 1 and set.

The detect terminal 210 is installed in the card tray insertion space 101 of the housing 100; it has internal elasticity such that when the card tray 1 is inserted into the insertion space 101 of the housing 100, it contacts the card tray 1 and is elastically pushed downward.

In addition, the detect terminal 210 is located inside the aperture 103 that is formed in the housing 100; when the card tray 1 is inserted/withdrawn, it is elastically deflected vertically through the aperture 103.

The detect terminal 210 has a cantilevered shape, and is arranged parallel to the insertion/withdrawal direction of the card tray 1 so that when it is contacted with the card tray 1 it is pushed downward without pushing in the insertion direction of the card tray 1; force is applied to the card tray 1 in the direction perpendicular to the insertion/withdrawal direction of the card tray 1.

Figure 5A:
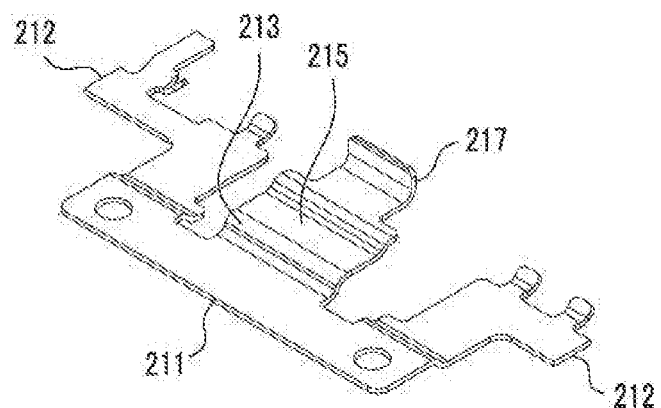
FIGS. 5A and 5B show a different embodiment of the detect terminal where
Figure 5B:
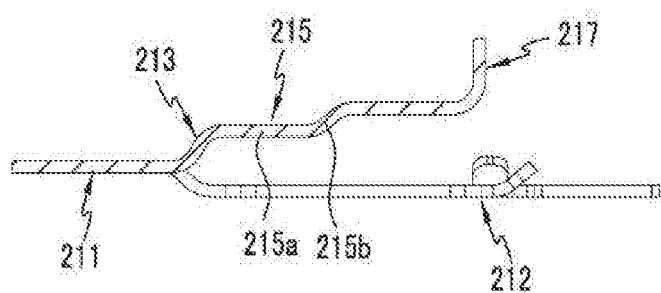
Figure 6A:
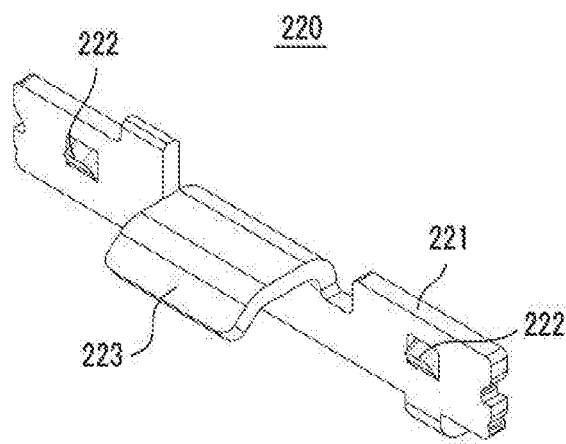
FIGS. 6A and 6B show the switch terminal where
Figure 6B:
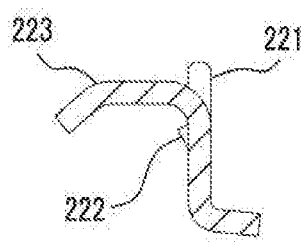

The detect terminal 210 may comprise a 1st fixing part 211, push guide part 213, leaf spring part 215, 1st contact part 217, and insulating part 219. This type of detect terminal 210 may comprise an insulating part 219, or as shown in FIGS. 5A and 5B, may also not comprise an insulating part 219.

The 1st fixing part 211 is in the form of a plate, and is formed integrally by molding to the front end of the housing 100. In addition, the 1st fixing part 211 has a single side support 212, or two or more side supports 212 formed extending in the direction of the cantilever of the detect terminal 210, and is insert-molded to either side of the through part of the housing 100. The side supports 212 are fixed to the housing 100, so that when the below-described leaf spring part 215 is pushed downward, they serve to support the leaf spring part 215 so that the leaf spring part 215 has an upward restoring force; the side supports 212 may be formed as leaf springs spaced apart at a certain interval on either side of the bottom of the leaf spring part 215.

The push guide part 213 is bent sloping upward at the rear end of the 1st fixing part 211, so that as the card tray 1 inserted into the insertion space 101 of the housing 100 slides along the sloped surface, it is guided so as to push the detect terminal 210 downward.

The leaf spring part 215 is a part that is pushed by the card tray 1; it is installed in a direction identical to the insertion direction of the card tray 1, toward the back (inside the aperture 103) of the housing 100. As depicted, it has the form of a leaf spring and thus has internal elasticity. One end of the leaf spring part 215 is connected to the 1st fixing part 211 via the push guide part 213, and on the other end, the below-described 1st contact part 217 is furnished so as to contact the switch terminal 220. This leaf spring part 215 may comprise a downward-sloping surface 215a that is bent at a downward slope at the rear end of the push guide part 213, and an upward-sloping surface 215b that is bent sloping upward from the downward-sloping surface 215a.

The 1st contact part 217 is bent sloping upward at the rear end of the leaf spring part 215 so as to contact the 2nd contact part 223 of the switch terminal 220. The bottom of the 1st contact part 217 is formed so as to be located above the bottom of the below-described insulating part 219.

The insulating part 219 is formed integrally with the leaf spring part 215, and serves to insulate the contact area when it comes into contact with conductive material in the card tray 1. In other words, the insulating part 219 serves to prevent electrical current from flowing to the metal terminal of the detect terminal 210, by preventing direct contact with the detect terminal 210 when a metallic object touches the detect terminal 210.

As can be appreciated, the insulating part 219 is depicted as being configured in a rod shape formed so as to have length direction in the width direction of the leaf spring part 215, but it is not limited thereto, and the insulating part 219 may also be configured in diverse other ways. For example, the insulating part 219 may be formed on all or only part of the leaf spring part 215.

The insulating part 219 may be furnished with a top protrusion 219a and bottom protrusion 219b that respectively protrude above and below the leaf spring part 215. In the top protrusion 219a, an upward-sloping surface 219a' may be formed corresponding to the upward-sloping surface 1a, see FIGS. 10A-10C of the bottom front of the card tray 1, so that when the card tray 1 contacts an insulating part 219, the sloped surface 1a of the card tray 1 slides along the upward-sloping surface 219a' while pushing on the insulating part 219, and the leaf spring part 215 is elastically deformed downward by means of the insulating part 219, so that the plasticity of the detect terminal 210 may be minimized.

In addition, the bottom of the bottom protrusion 219b protrudes further downward than the bottom of the 1st contact part 217; in the aperture 103, when the leaf spring part 215 moves downward, the bottom of the bottom protrusion 219b touches the object located below the aperture 103 before the bottom of the 1st contact part 217, so that the 1st contact part 217 may prevent contact with the object. In other words, because if the 1st contact part 217 is pushed to a position below the bottom surface of the housing 100, there is risk that it will contact the PCB not shown and damage the PCB as a result; in order to prevent this, it is preferable to have the bottom of the bottom protrusion 219b of the insulating part 219 be formed so as to be located below the bottom of the 1st contact part 217. Depending on the process, if there is no insulator present, the top protrusion 219a may be formed to minimize plasticity, corresponding to the shape of the tray, similarly to the insulating part 219. The detect terminal 210 may be formed in this way over its entire shape, or only in part.

The switch terminal 220 is installed on top of the detect terminal 210 inside the insertion space 101 of the housing 100; as the detect terminal 210 is pushed downward, the contact with the detect terminal 210 is broken. Because, at this time, the contact of the 1st contact part 217 of the detect terminal 210 with the 2nd contact part 223 is broken along the sloped surface, by a movement corresponding to the sloped surface of the tray and the sloped surface of the insulating part 219, wiping occurs so that surface contaminants may be removed.

The switch terminal 220 may comprise a 2nd fixing part 221, and a 2nd contact part 223. The 2nd fixing part 221 is formed as a vertical plate and is fixed in place by being assembled by insertion into the assembly recess, see FIGS. 7A and 7B formed on the rear end of the housing 100. In the 2nd fixing part 221, a detachment-prevention projection 222 may be formed and fixed in place by insertion into the recess part not shown formed inside the assembly recess 105. The 2nd contact part 223 is formed extending forward from the 2nd contact part 221 and sloping downward, and contacts the 1st contact part 217.

Figure 7A:
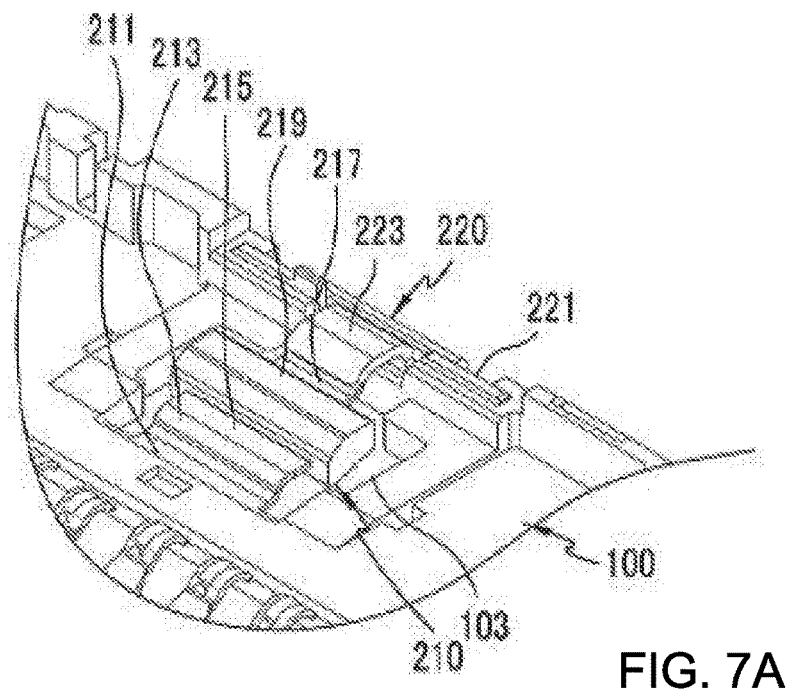
FIGS. 7A and 7B show the switch terminal prior to being assembled to the housing where
Figure 7B:
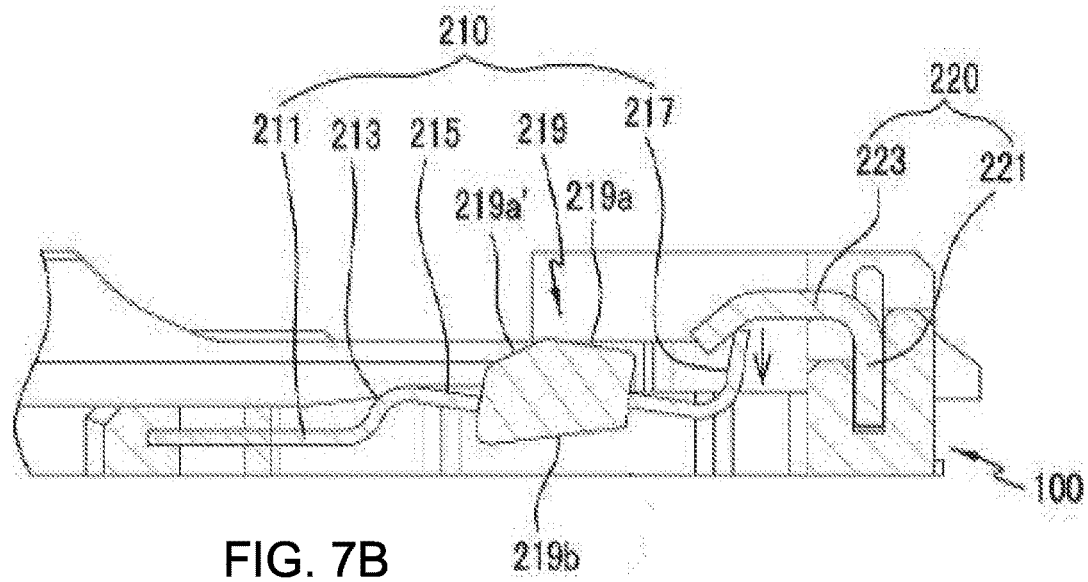

As shown in FIGS. 7A and 7B, at the detect terminal 210, the 1st fixing part 211 is fixed to the front end of the housing 100 so that at the switch terminal 220 in its initial state before assembly, the leaf spring part 215 of the detect terminal 210 is located so as to slope upward. In this condition, the switch terminal 220 may be assembled so that the 2nd fixing part 221 is inserted into either the bottom or the top of the assembly recess 105 formed on the rear end of the housing 100.

Figure 8A:
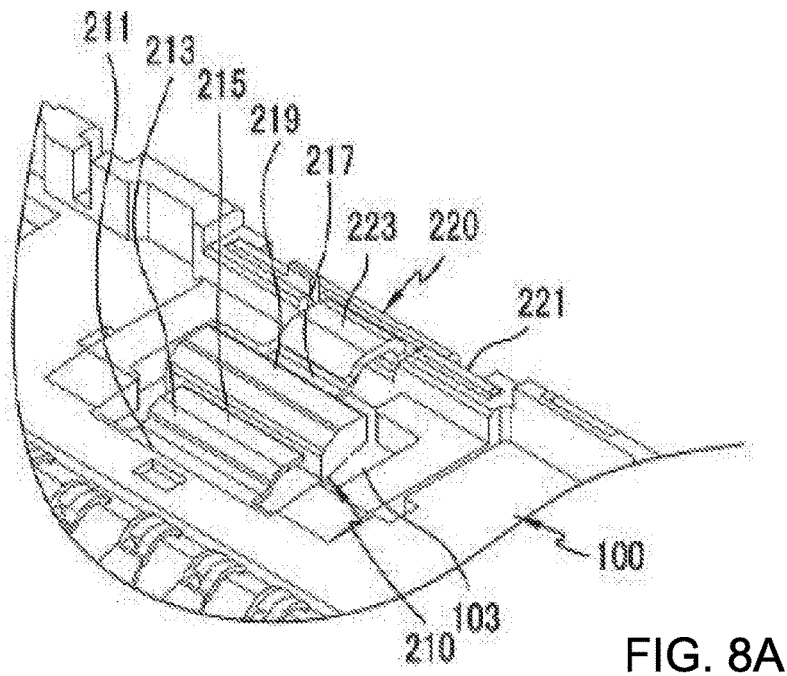
FIGS. 8A and 8B show the switch terminal after it is assembled to the housing where
Figure 8B:
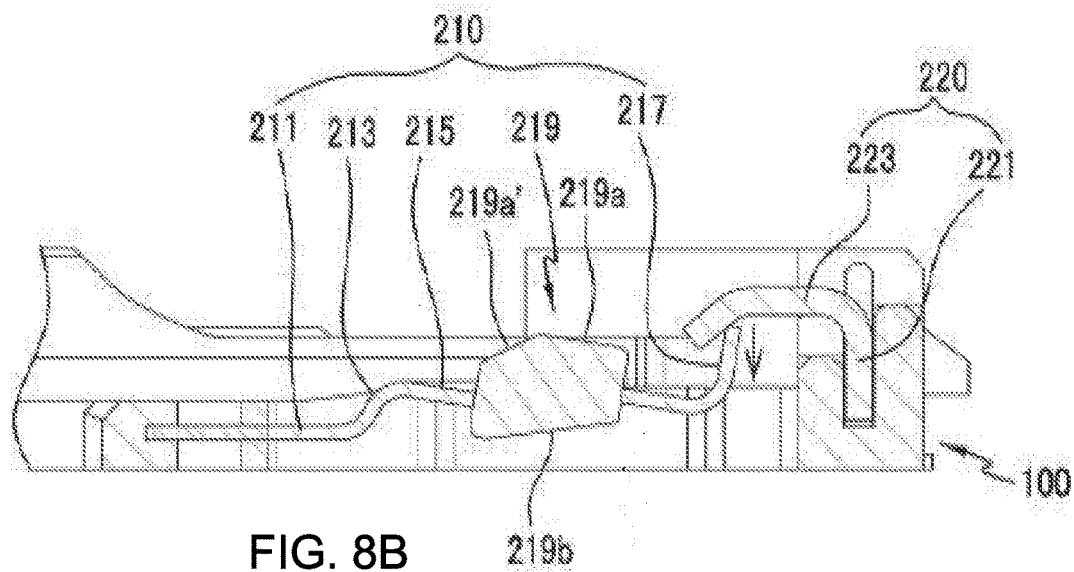

As shown in FIGS. 8A and 8B, as the switch terminal 220 is assembled to the housing 100, the 1st contact part 217 of the detect terminal 210 contacts the 2nd contact part 223 of the switch terminal 220, and descends downward while the detect terminal 210 accumulates upward elastic force, so that a contact point is established between the 1st contact part 217 and 2nd contact part 223.

Figure 9:
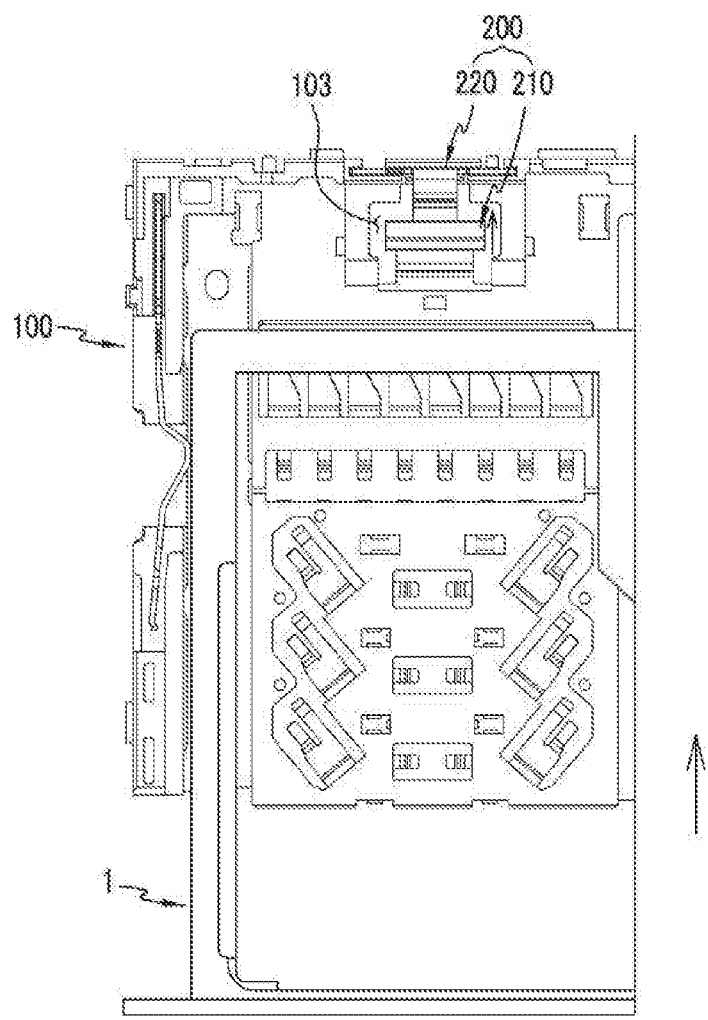
FIG. 9 is a top view of the state in which the card tray insertion direction and detect terminal cantilever direction are in parallel.

As shown in FIG. 9, when the card tray 1 is inserted into the insertion space 101 of the housing 100, because the insertion direction of the card tray 1 is parallel to the cantilever direction of the detect terminal 210, the moment the detect terminal 210 comes into contact with the card tray 1, the free end of the detect terminal 210 moves downward without being directly pushed by the card tray 1.

Figure 10A:
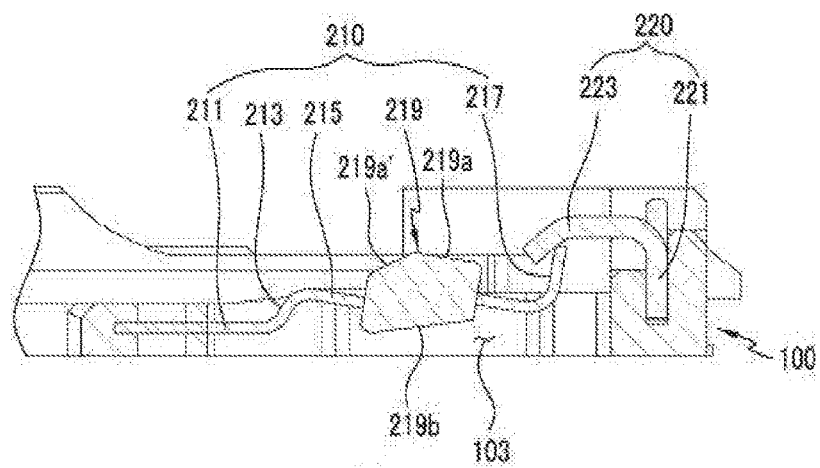
FIGS. 10A-10C are cross-sections of the state in which contact has been broken between the detect terminal and the switch terminal, due to card tray insertion.

As shown in FIG. 10A, before insertion of the card tray 1 into the housing 100, the 2nd contact part 223 of the switch terminal 220 and the 1st contact part 217 of the detect terminal 210 are n contact; as a result, the detection switch 200 detects that the card tray 1 has not been inserted, or has not been completely inserted, into the insertion space 101 of the housing 100.

Figure 10B:
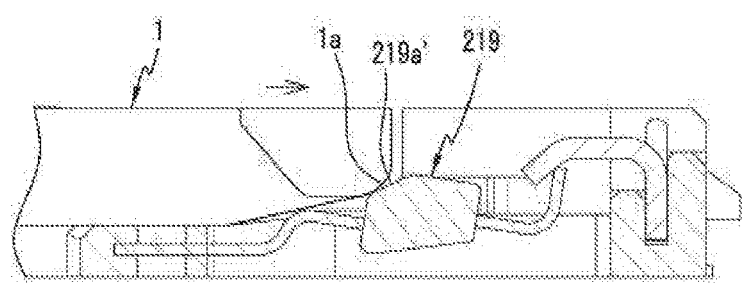

As shown in FIG. 10B, if the card tray 1 is inserted into the insertion space of the housing 100, contact occurs between the card tray 1 and the detect terminal 210.

When the card tray 1 is in contact with the detect terminal 210, the sloped surface 1a formed on the front bottom surface of the card tray 1 meets the upward-sloping surface 219a' formed on the insulating part 219 of the detect terminal 210, and the sloped surface 1a of the card tray 1 follows the upward-sloping surface of the insulating part 219 so that the 1st contact part 217 of the detect terminal 210 moves slidingly so that the 1st contact part 217 wipes against the 2nd contact part 223, and as a result, the card tray 1 is smoothly inserted into the insertion space of the housing 100.

In other words, the card tray 1 is inserted into the housing 100 so that the 1st contact part 217 of the detect terminal 210 and the 2nd contact part 223 of the switch terminal 220 are in contact with one another until the upward-sloping surface 219a' formed on the insulating part 219 of the detect terminal 210 meets sloped surface 1a formed on the front bottom surface of the card tray 1. In addition, from the time at which the contact of the insulating part 219 of the detect terminal 210 with the card tray 1 begins, the detect terminal 210 begins to move downward.

Figure 10C:
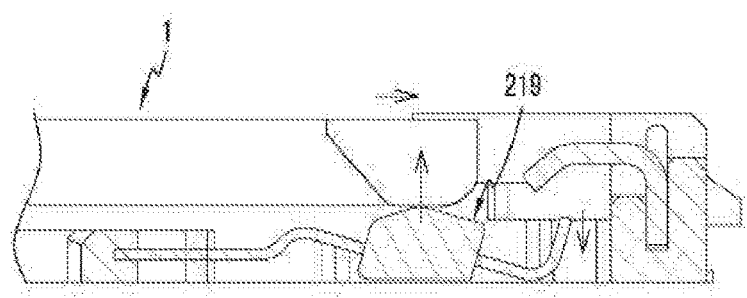

As shown in FIG. 10C, if the card tray 1 passes the upward-sloped surface 219a' of the insulating part 219 so that the bottom of the card tray 1 is located at the top of the insulating part 219, the detect terminal 210 is pushed downward as much as possible by the card tray 1, and the leaf spring part 215 of the detect terminal 210 is elastically deformed downward by means of the insulating part 219, so that the plasticity of the detect terminal 210 is minimized. Likewise, as the card tray 1 pushes the detect terminal 210 downward, the detect terminal 210 pushes the card tray 1 in the opposite direction, upward perpendicularly to the insertion direction of the card tray 1.

Accordingly, the card tray 1 is prevented from being pushed in the withdrawal direction, by the insertion/withdrawal direction of the card tray 1 being perpendicular to the vertical direction of contact between the detect terminal 210 and the switch terminal 220. In other words, because the detect terminal 210 and switch terminal 220 are in contact vertically, the card tray 1 is not affected by any force in the withdrawal direction due to the detect terminal 210, and thus there is no risk of an exterior nonconformity between the card tray 1 and set.

As the detect terminal 210 moves downward due to the insertion of the card tray 1, the 2nd contact part 223 of the switch terminal 220 and the 1st contact part 217 of the detect terminal 210 move vertically to break contact. Likewise, if the detect terminal 210 and switch terminal 220 are not in contact with one another, the card tray 1 is detected to have been fully and completely inserted into the insertion space 101 of the housing 100.

Hereinabove, the card socket for use in electronic devices has been described based on a preferred embodiment, but is not limited to any specific embodiment, and a person of ordinary skill in the art of the relevant field will be able to make diverse modifications without departing from the scope of the appended claims.

The invention claimed is:

1. A card socket for use in electronic devices, comprising:
   a housing having a front end and a rear end, the housing defining an insertion space which is open at the front end of the housing, the insertion space defining an insertion direction for a card tray;
   a detect terminal installed in the insertion space of the housing, wherein the detect terminal is configured to be contacted with the card tray and deflected out of the insertion space when the card tray is inserted into the insertion space, the detect terminal having an insulating part formed thereon, the insulating part configured to insulate the detect terminal when the detect terminal is contacted by a conductive material on the card tray; and
   a switch terminal that is installed in the insertion space of the housing, wherein the switch terminal comprises a 2nd fixing part that is fixed to the rear end of the housing and a 2nd contact part that is formed extending toward the front end of the housing from the 2nd fixing part and sloping upward or downward, and which is configured to contact the detect terminal, wherein the switch terminal and the detect terminal are configured to change between a connected state and a disconnected state when the detect terminal is deflected out of the insertion space, wherein the detect terminal is biased so that, in operation, the detect terminal presses against an inserted card tray in a direction that is perpendicular to the insertion direction.

2. The card socket of claim 1, wherein the detect terminal has a cantilevered shape, and the switch terminal is installed on a top of a free end of the detect terminal, and the detect terminal is configured to cease to contact the switch terminal as the detect terminal is pushed downward.

3. The card socket of claim 1, wherein the detect terminal has a cantilevered shape, and the switch terminal is installed on a bottom of a free end of the detect terminal, and the detect terminal is configured to contact the switch terminal as the detect terminal is pushed downward.

4. The card socket of claim 1, wherein the detect terminal is located within a through part that is formed penetrating vertically through a bottom surface of the housing, and is configured to elastically deform vertically via the through part when the card tray is inserted/withdrawn.

5. The card socket of claim 4, wherein the detect terminal comprises:
   a 1st fixing part that is fixed to a front end of the through part formed in the housing;
   a push guide part that is bent sloping upward from a rear end of the 1st fixing part so that as the card tray is inserted into the insertion space of the housing, the card tray slides along the push guide part and the detect terminal is configured to be guided so as to push downward;
   a leaf spring part that is formed bending downward and rearward from a rear end of the push guide part, and has internal elasticity and extends in a direction identical to the insertion direction of the card tray; and
   a 1st contact part that is formed bending upward or downward from a rear end of the leaf spring part, the $1^{st}$ contact part configured to contact the $2^{nd}$ contact part.

6. The card socket of claim 5, wherein the insulating part is formed integrally with the leaf spring part,
   and wherein the insulating part is furnished with a top protrusion that protrudes above the leaf spring part, and on the top protrusion, an upward-sloping surface is formed corresponding to an upward-sloping surface on a front bottom surface of the card tray, so that when the card tray contacts the insulating part, the upward-sloping surface of the card tray slides along the upward-sloping surface of the top protrusion while pushing the insulating part, and the leaf spring part is configured to elastically deform downward via the insulating part, so that the plasticity of the detect terminal is minimized.

7. The card socket of claim 6, wherein the insulating part is further furnished with a bottom protrusion that projects on top of the leaf spring part, and a bottom edge of the bottom protrusion protrudes downward further than a bottom edge of the 1st contact part, and when the leaf spring part moves downward inside the through part, the bottom edge of the bottom protrusion is configured to first contact an object located on a bottom of the through part before the bottom edge of the 1st contact part, so that contact between the 1st contact part and the object may be prevented.

8. The card socket of claim 1, wherein the detect terminal is formed integrally by molding the 1st fixing part onto a front edge of the through part formed in the housing and the switch terminal is assembled by fastening the 2nd fixing part into an assembly recess formed on a rear edge of the housing.

9. The card socket of claim 8, wherein a stable point of contact is established between the 1st contact part and the 2nd contact part, by the detect terminal having upward elasticity while the 1st contact part of the detect terminal and the 2nd contact part of the switch terminal come into contact and are pushed downward, due to the switch terminal being assembled to the housing.

10. A card socket for use in electronic devices, comprising:
   a housing having a front end, a rear end, and a bottom surface extending from the front end to the rear end, the housing defining an insertion space above the bottom surface, the insertion space being open at the front end of the housing, the insertion space defining an insertion direction for a card tray;
   a detection switch which is secured to the housing proximate to the rear end thereof, the detection switch comprising a switch terminal and a detect terminal, the detect terminal being at least partially positioned within the insertion space; and
   at least one contact terminal which is secured to the housing proximate to the front end thereof, the at least one contact terminal being configured to contact the card tray,
   wherein the detection switch is entirely positioned rearward of the at least one contact terminal,
   wherein the detect terminal is configured to be contacted with the card tray and deflected out of the insertion space when the card tray is inserted into the insertion space, wherein the switch terminal and the detect terminal are configured to change between a connected state and a disconnected state when the detect terminal is deflected out of the insertion space, wherein the detect terminal is biased so that, in operation, the detect terminal presses against an inserted card tray in a direction that is perpendicular to the insertion direction, and wherein the detect terminal has a cantilevered shape, and the switch terminal is installed on a top of a free end of the detect terminal, and the detect terminal ceases to contact the switch terminal as the detect terminal is pushed downward toward the bottom surface.

11. The card socket of claim 10, wherein the detect terminal is located within a through part that is formed penetrating vertically through the bottom surface of the insertion space of the housing, and is configured to elastically deform vertically via the through part when the card tray is inserted/withdrawn.

12. The card socket of claim 11, wherein the detect terminal comprises:
- a 1st fixing part that is fixed to a front end of the through part formed in the housing;
- a push guide part that is bent sloping upward from a rear end of the 1st fixing part so that as the card tray is inserted into the insertion space of the housing, the card tray slides along the push guide part and the detect terminal is configured to be guided so as to push downward;
- a leaf spring part that is formed bending downward and rearward from a rear end of the push guide part, and has internal elasticity and extends in a direction identical to the insertion direction of the card tray; and
- a 1st contact part that is formed bending upward or downward from a rear end of the leaf spring part.

13. The card socket of claim 12, wherein the leaf spring part has an insulating part formed thereon, the insulating part configured to insulate the detect terminal when the detect terminal is contacted by a conductive material on the card tray.

14. The card socket of claim 13, wherein the insulating part is formed integrally with the leaf spring part, and wherein the insulating part is furnished with a top protrusion that protrudes above the leaf spring part, and on the top protrusion, an upward-sloping surface is formed corresponding to an upward-sloping surface on a front bottom surface of the card tray, so that when the card tray contacts the insulating part, the upward-sloping surface of the card tray slides along the upward-sloping surface of the top protrusion while pushing the insulating part, and the leaf spring part is configured to elastically deform downward via the insulating part, so that the plasticity of the detect terminal is minimized.

15. The card socket of claim 14, wherein the insulating part is further furnished with a bottom protrusion that projects on top of the leaf spring part, and a bottom edge of the bottom protrusion protrudes downward further than a bottom edge of the 1st contact part, and when the leaf spring part moves downward inside the through part, the bottom edge of the bottom protrusion is configured to first contact an object located on a bottom of the through part before the bottom edge of the 1st contact part, so that contact between the 1st contact part and the object may be prevented.

16. The card socket of claim 12, wherein the switch terminal comprises a 2nd fixing part that is fixed to a rear end of the housing and a 2nd contact part that is formed extending forward from the 2nd contact part and sloping upward or downward, and which is configured to contact the 1st contact part.

17. The card socket of claim 16, wherein the detect terminal is formed integrally by molding the 1st fixing part onto a front edge of the through part formed in the housing and the switch terminal is assembled by fastening the 2nd fixing part into an assembly recess formed on a rear edge of the housing.

18. The card socket of claim 17, wherein a stable point of contact is established between the 1st contact part and the 2nd contact part, by the detect terminal having upward elasticity while the 1st contact part of the detect terminal and the 2nd contact part of the switch terminal come into contact and are pushed downward, due to the switch terminal being assembled to the housing.

19. The card socket of claim 10, wherein the detect terminal has an insulating part formed thereon, the insulating part configured to insulate the detect terminal when the detect terminal is contacted by a conductive material on the card tray.

20. A card socket for use in electronic devices, comprising:
- a housing having a front end, a rear end, and a bottom surface extending from the front end to the rear end, the housing defining an insertion space above the bottom surface, the insertion space being open at the front end of the housing, the insertion space defining an insertion direction for a card tray;
- a detection switch which is secured to the housing proximate to the rear end thereof, the detection switch comprising a switch terminal and a detect terminal, the detect terminal being at least partially positioned within the insertion space; and
- at least one contact terminal which is secured to the housing proximate to the front end thereof, the at least one contact terminal being configured to contact the card tray, wherein the detection switch is entirely positioned rearward of the at least one contact terminal, wherein the detect terminal is configured to be contacted with the card tray and deflected out of the insertion space when the card tray is inserted into the insertion space, wherein the switch terminal and the detect terminal are configured to change between a connected state and a disconnected state when the detect terminal is deflected out of the insertion space, wherein the detect terminal is biased so that, in operation, the detect terminal presses against an inserted card tray in a direction that is perpendicular to the insertion direction, and wherein the detect terminal has a cantilevered shape, and the switch terminal is installed on a bottom of a free end of the detect terminal, and the detect terminal contacts the switch terminal as the detect terminal is pushed downward toward the bottom surface.

21. A card socket for use in electronic devices, comprising:
- a housing having a front end and a rear end, the housing defining an insertion space which is open at the front end of the housing, the insertion space defining an insertion direction for a card tray; and
- a detection switch which is positioned proximate to the rear end of the housing, the detection switch comprising a switch terminal and a detect terminal, wherein the detect terminal comprises:

a 1$^{st}$ fixing part having a plate portion and a first side support, the plate portion being secured to the housing and extending from a first side end thereof to a second side end thereof in a direction transverse to the insertion direction, the first side support extends rearwardly from the plate portion proximate to the first side end thereof, the first side support being secured to the housing;

a cantilevered part which extends rearwardly from the plate portion between the first side support and the second side end thereof to a free end thereof, the cantilevered part being at least partially positioned within the insertion space, the cantilevered part being configured to be contacted with the card tray and deflected out of the insertion space when the card tray is inserted into the insertion space, wherein the switch terminal and the detect terminal are configured to change between a connected state and a disconnected state when the cantilevered part is deflected out of the insertion space, and wherein the cantilevered part is biased so that, in operation, the cantilevered part is configured to press against the inserted card tray in a direction that is perpendicular to the insertion direction.

22. The card socket as defined in claim 21, further comprising a second side support which extends rearwardly from the plate portion proximate to the second side end thereof, the cantilevered part being positioned between the first and second side supports.

23. The card socket as defined in claim 21, wherein the cantilevered part comprises a push guide part, a leaf spring part, and a 1$^{st}$ contact part, the push guide part being bent sloping upward from the plate portion so that as the card tray is inserted into the insertion space of the housing, the card tray slides along the push guide part and the cantilevered part is configured to be guided so as to push downward, the leaf spring part being formed bending downward and rearward from a rear end of the push guide part, and has internal elasticity and extends in a direction identical to the insertion direction of the card tray, the 1$^{st}$ contact part being formed bending upward or downward from a rear end of the leaf spring part.

24. The card socket as defined in claim 23, wherein the leaf spring part has an insulating part formed thereon, the insulating part configured to insulate the detect terminal when the cantilevered part is contacted by a conductive material on the card tray.

25. The card socket as defined in claim 24, wherein the insulating part is furnished with a top protrusion that protrudes above the leaf spring part, and on the top protrusion, an upward-sloping surface is formed corresponding to an upward-sloping surface on a front bottom surface of the card tray, so that when the card tray contacts the insulating part, the upward-sloping surface of the card tray slides along the upward-sloping surface of the top protrusion while pushing the insulating part, and the leaf spring part is configured to be elastically deformed downward via the insulating part, so that the plasticity of the detect terminal is minimized.

26. The card socket as defined in claim 25, wherein the insulating part is further furnished with a bottom protrusion that projects on top of the leaf spring part, and a bottom edge of the bottom protrusion protrudes downward and further than a bottom edge of the 1$^{st}$ contact part.

27. The card socket as defined in claim 23, wherein the switch terminal comprises a 2$^{nd}$ fixing part and a 2$^{nd}$ contact part, the 2$^{nd}$ fixing part being fixed to a rear end of the housing, the 2$^{nd}$ contact part extending forward from the 2$^{nd}$ fixing part and sloping upward or downward, the 2$^{nd}$ contact part being configured to contact the 1$^{st}$ contact part.

28. The card socket as defined in claim 21, wherein the cantilevered part has an insulating part formed thereon, the insulating part configured to insulate the detect terminal when the cantilevered part is contacted by a conductive material on the card tray.

29. The card socket as defined in claim 21, wherein the switch terminal is installed on a top of the free end of the cantilevered part, and the cantilevered part is configured to cease to contact the switch terminal as the cantilevered part is pushed downward.

30. The card socket as defined in claim 21, wherein the switch terminal is installed on a bottom of the free end of the cantilevered part, and the cantilevered part is configured to contact the switch terminal as the cantilevered part is pushed downward.

31. The card socket as defined in claim 21, wherein the housing has a through part that is formed penetrating vertically through a bottom surface of the insertion space of the housing, wherein the cantilevered part is configured to elastically deform vertically via the through part when the card tray is inserted/withdrawn.

* * * * *